United States Patent Office 3,404,422
Patented Oct. 8, 1968

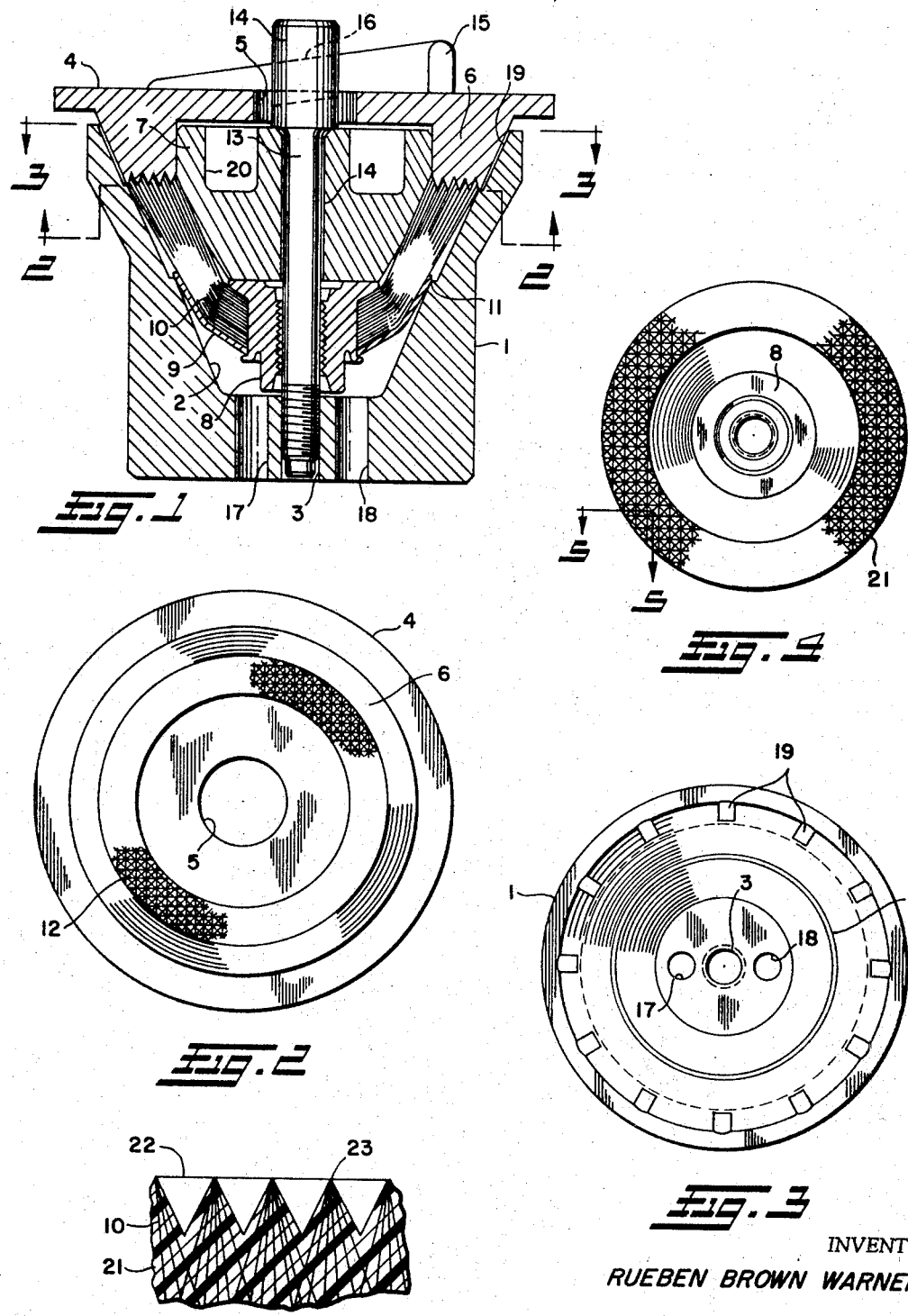

3,404,422
COMPOSITE BRUSH
Rueben Brown Warner, Lakewood, Ohio, assignor to The Osborn Manufacturing Company, Cleveland, Ohio, a corporation of Ohio
Filed June 13, 1967, Ser. No. 645,751
7 Claims. (Cl. 15—180)

ABSTRACT OF THE DISCLOSURE

A brushing tool having bristles embedded in a molded body of elastomeric material, with such elastomeric material being molded at the working face of the tool into a large number of slightly projecting portions having recesses therebetween, the outer ends of the brush bristles being received and embedded within the projecting portions. When the brush is placed in the mold prior to performance of the elastomer molding operation, the ends of the bristles are received and engaged in a large number of normally uniformly spaced shallow recesses, thereby to form the above brushing tool when the elastomeric material is molded thereabout in such mold, and also serving to maintain such bristles uniformly distributed during the molding operation.

---

The present invention relates as indicated to a novel composite brush. Brushes having the brush bristle material embedded within a body or matrix of elastomeric material are well-known in the art as shown, for example, in Peterson Patent 3,076,219, and Stingley Patent 2,950,495 and such brush may be in a variety of forms such as wheel brushes, cup brushes, and end brushes. One of the problems which has been encountered in the manufacture of such composite brushing tools is that of maintaining the brush bristle material uniformly distributed in the region of the brush face during the molding operation so that the bristle ends will be correspondingly uniformly distributed at the working face of the resultant molded article. Another problem which has been regularly encountered is the necessity for a "break-in" period of operation of the tool before it becomes fully effective for its intended purpose. More particularly, since the outer end portions of the bristles have been completely embedded in the body of elastomeric material a preliminary period of operation against a workpiece or the like has been required to erode away a certain amount of the elastomeric material from between the bristle ends so that the latter may project therefrom on the order of about one-eighth (⅛) of an inch, for example, before the tool becomes fully effective. Such break-in period is naturally objectionable to the purchaser of the tool, and it has therefore become the practice on the part of the manufacturer to subject the working face of the new molded article to an abrading operation, usually by means of a power driven rotary wire brush thus to remove a small amount of the elastomer from the working face of the tool before the latter is shipped to the customer. Such supplemental preparatory operation is an added expense in the manufacture of the tool, tends to be somewhat non-uniform, depending on the experience and skill of the operator, and renders the tool somewhat less attractive in appearance although of course more immediately useful to the customer.

It is accordingly an object of this invention to provide composite brushing tools in which brush bristle material is substantially uniformly distributed at the working face of the tool.

Another object is to provide such tools whereby the working ends of the brush bristles will initially project a short distance beyond the main body of elastomeric material, thereby obviating the necessity of a further operation on such working face preparatory to employment of the tool for its intended purpose.

Still another object is to provide a novel composite brushing tool in which the outer ends of the bristles are uniformly distributed and received and embedded within a large number of slightly projecting portions of the elastomeric body in a manner such that the tool may immediately perform useful work. Other objects of the invention will appear as the description proceeds.

To the accomplishment of the foregoing and related ends, the invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a vertical section through a mold assembly showing a cup brush positioned therewithin for performance of the molding operation of this invention;

FIG. 2 is a plan view of the upper mold member taken on the line 2—2 of FIG. 1;

FIG. 3 is a plan view of the lower mold member taken on the line 3—3 of FIG. 1;

FIG. 4 is a plan view of such cup brush following completion of the molding operation and showing the brushing face of the tool; and FIG. 5 is an enlarged fragmentary section taken through the brushing face of the composite molded cup brush of FIG. 4 taken on the line 5—5 of such figure, showing a substantial number of brush bristle end portions grouped and retained within each of the shallow recesses in the mold part.

Referring now particularly to said drawing, a preferred embodiment of the invention is there illustrated showing the manufacture of a composite brushing tool of cup shape, but it is to be understood that the principle of the invention is adapted to be employed in the manufacture of similar composite brushing tools which may be in the form of wheel brushes or end brushes, for example. A lower female mold member 1 is provided having an inner cavity 2 and an axial threaded opening 3 in the bottom thereof for a purpose explained below. An upper annular mold member 4 is provided with a central opening 5 and a downwardly projecting annular rib 6 adapted to fit within the upper portion of the inverted frusto-conical surface of mold cavity 2. A frusto-conical inner male mold member 7 is provided having a vertical cylindrical outer surface of its upper portion adapted to fit slidably within the radially inner face of rib 6.

Further details of the mold construction will be better understood from the following description of the molding operation.

A cup brush of generally conventional design having a centrally aperture hub member 8, a sheet metal cup element 9, and brush bristle material 10 is inserted within lower female mold member 1 as shown, cup 9 making reasonably tight sealing engagement with shoulder 11 of the mold. Inner male mold member 7 is inserted within such brush, resting upon hub 8, and engaging the radially inner surface of the annular layer of brush bristles 10. The upper mold member 4 is then fitted over mold member 7 with the lower surface of annular rib 6 engaging the brush bristle end portion.

As shown in FIGS. 1 and 2, such lower face 12 of rib 6 is formed with an indented waffle design comprising a large number of small, closely spaced pyramidal protuberances separated by corresponding narrow grooves into which the brush bristle end portions enter. Such bristle end portions are thus securely held and maintained in their uniformly distributed relationship at the brush face during performance of the subsequent molding operation.

An elongated bolt 13 is inserted through central opening 5 in mold member 4, through central aperture 14 of mold member 7, through the central aperture of brush hub 8 and threadedly engaged in axial opening 3 in the bottom of mold member 1. The undersurface of bolthead 14 engages the upper surface of male mold member 7 tightly to clamp such member in place while holding cup 9 in tight engagement with shoulder 11. A wedge 15 is forced through slot 16 in bolthead 14 thereby to lock upper mold member 4 firmly in sealing engagement with outer mold member 1.

As shown in FIGS. 1 and 3, mold member 1 is provided with two knockout openings 17 and 18, and also with a plurality of shallow radial slots such as 19 which extend from the outer lip of mold member 1 downwardly a distance equal to the portion of rib 6 seated within the mold.

Before placing upper mold member 4 in position as above-described, a fluid elastomeric material is poured into the mold and penetrates between the bristles 10. After the mold has been finally closed and locked such elastomeric material is cured to the degree of hardness desired, usually to readily resiliently deformable condition. The mold is then opened and the finished molded composite article removed therefrom. The annular recess 20 in male mold member 7 and the knockout openings 17 and 18 are provided to assist in thus opening the mold when necessary but, with many types of elastomeric compositions and the employment of proper parting compounds, no serious sticking of the mold parts is encountered.

As will be apparent from the foregoing, the resultant composite molded brushing tool illustrated in FIGS. 4 and 5 closely resembles the original cup brush in shape and conformation except that the layer of brush bristles 10 is now embedded within a resiliently deformable body of elastomeric material 21. Furthermore, such composite tool has a molded working face comprised of a large number of closely spaced intersecting ridges of elastomeric material such as 22 and 23 which may project approximately three-sixteenths ($3/16$th) of an inch from the main body of such elastomer and contain the generally uniformly distributed end portions of the bristles therewithin. (See FIG. 5.) Such brush bristle end portions are thus enabled to act upon a workpiece in the desired effective manner as soon as the brushing tool is placed in operation and without any break-in period or preparatory abrading of the tool working face. The tools thus produced are moreover all uniform in this respect and of much more attractive appearance.

It will be appreciated and understood that instead of the so-called waffle design or pattern of the ridges produced at the working face of the tool, a wide variety of other patterns may instead be employed such as, for example, closely spaced radial ridges, closely spaced circumferential ridges, and a large number of closely spaced individual protuberances or fingers. In each instance, the bristle tips are received within recesses in the mold face of mold rib 6 and thereby held and maintained in proper uniform distribution during performance of the molding operation. This feature is particularly advantageous in those cases where straight bristle material is employed since localized compaction of the latter is a frequent problem, but is beneficial in all cases even when employing crimped wire brush bristle material, for example.

A wide variety of elastomeric materials may be utilized, depending upon the particular properties desired in the resultant tool, and it is often preferred that such elastomeric material be foamed both to permit a somewhat greater degree of relative brush bristle movement in use, and also to promote gradual erosion of the elastomeric material from between the bristle end portions as the latter wear back in use. Reference may be had to the aforesaid Peterson Patent 3,076,219 for a disclosure of various suitable brush bristle materials, plastic materials which may be utilized in the molding operation, filler materials which may be incorporated into the plastic materials to enhance the erodibility of the latter, and abrasives which may be included in the plastic or elastomer, if desired. For many purposes I have found the polyurethanes to be particularly suitable as the molded plastic material, and more particularly the polyurethane rubbers and the foamed elastomeric polyurethanes. The latter may be introduced into the mold prior to substantial reaction of their composite ingredients, the reaction taking place within the mold with incidental foaming induced by the presence of a small amount of water. Excess gas is enabled to escape through the slots 19 which likewise receive any flash produced in a form permitting ready removal from the finished molded article.

In the preparation of a preferred polyurethane for use in accordance with this invention toluene diisocyanate is reacted with a polyester or polyether to produce a long chain polyurethane. The addition of water to the reaction mixture causes cross-linking of the polyurethane chains, releasing carbon dioxide which serves as the foaming agent. A suitable formulation comprises:

| | Parts by weight |
|---|---|
| Polyester | 100.0 |
| Toluene diisocyanate | 35.0 |
| Water | 2.4 |
| N-methylmorpholine | 1.3 |
| Glycerol monoricinoleate | 1.0 |

Other suitable materials include foamed epoxy resins and vinyl plastisols. In addition to the other advantages of the foamed elastomers they are also lighter and require less plastic for a given size of tool. The elastomer need not necessarily extend entirely to the hub. The ridges or other protuberances at the face of the tool may be regularly spaced apart on the order of one-eighth ($1/8$) of an inch, for example, and may usually be from about one-sixteenth ($1/16$) to about one-quarter ($1/4$) inch in depth. Instead of employing an initially liquid elastomeric composition certain solid but flowable uncured natural and synthetic rubbers may be employed which may be softened by heat and caused to foam by inclusion of a suitable blowing compound, the composition thereafter being cured to the desired degree of resilience.

Other modes of applying the principle of the invention may be employed, change being made as regards the details described, provided the features stated in any of the following claims or the equivalent of such be employed.

I therefore particularly point out and distinctly claim as my invention:

1. A brushing tool having bristles embedded in a molded body of elastomeric material, characterized in that said elastomeric body is molded at the working face of said tool into a large number of slightly projecting narrow portions having tapered recesses therebetween, and the outer ends of said bristles are concentrated and embedded within said projecting portions, with a substantial number of said bristle end portions being thus grouped and embedded within each said projecting portion.

2. The tool of claim 1, wherein said elastomer is a polyurethane.

3. The tool of claim 1, wherein said elastomer contains a larger number of small cells.

4. The tool of claim 1, wherein said bristles are straight.

5. The tool of claim 1, wherein said bristles are wire.

6. The tool of claim 1, wherein said projecting portions are in the form of narrow ridges.

7. A brushing tool having bristles embedded in a molded body of elastomeric material, characterized in that said elastomeric body is molded at the working face of said tool into a large number of slightly projecting portions having recesses therebetween, and the outer ends of said bristles are received and embedded within said projecting portions, wherein said projecting portions are in the form of closely spaced intersecting narrow ridges.

References Cited

UNITED STATES PATENTS

| | | | |
|---|---|---|---|
| 2,154,846 | 4/1939 | Heymann et al. | 15—110 XR |
| 2,860,011 | 11/1958 | Dunn | 300—21 |
| 3,076,219 | 2/1963 | Peterson | 15—179 |
| 3,129,269 | 4/1964 | Charvat | 15—179 XR |

FOREIGN PATENTS

| | | |
|---|---|---|
| 1,101,420 | 10/1955 | France. |
| 1,138,596 | 1/1957 | France. |

PETER FELDMAN, *Primary Examiner.*